March 1, 1966
L. W. GILBERT ETAL
3,237,486
MACHINE TOOL
Original Filed Nov. 14, 1960
4 Sheets-Sheet 1
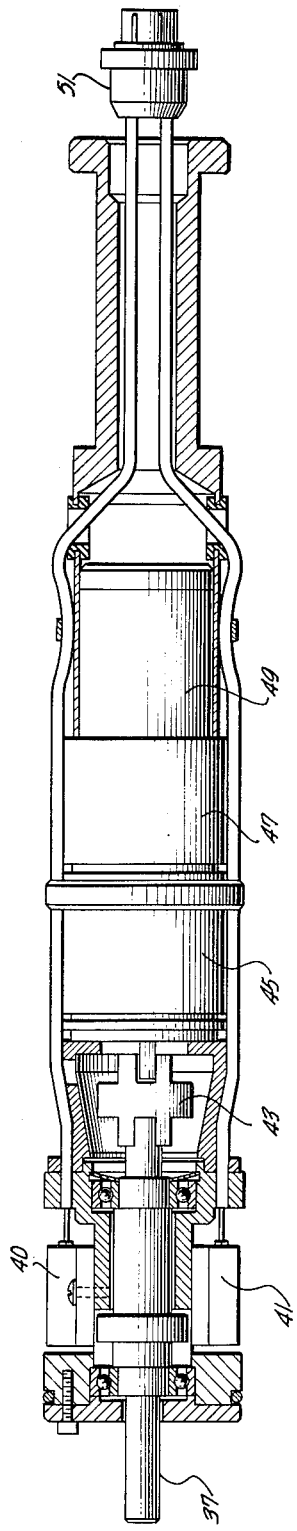
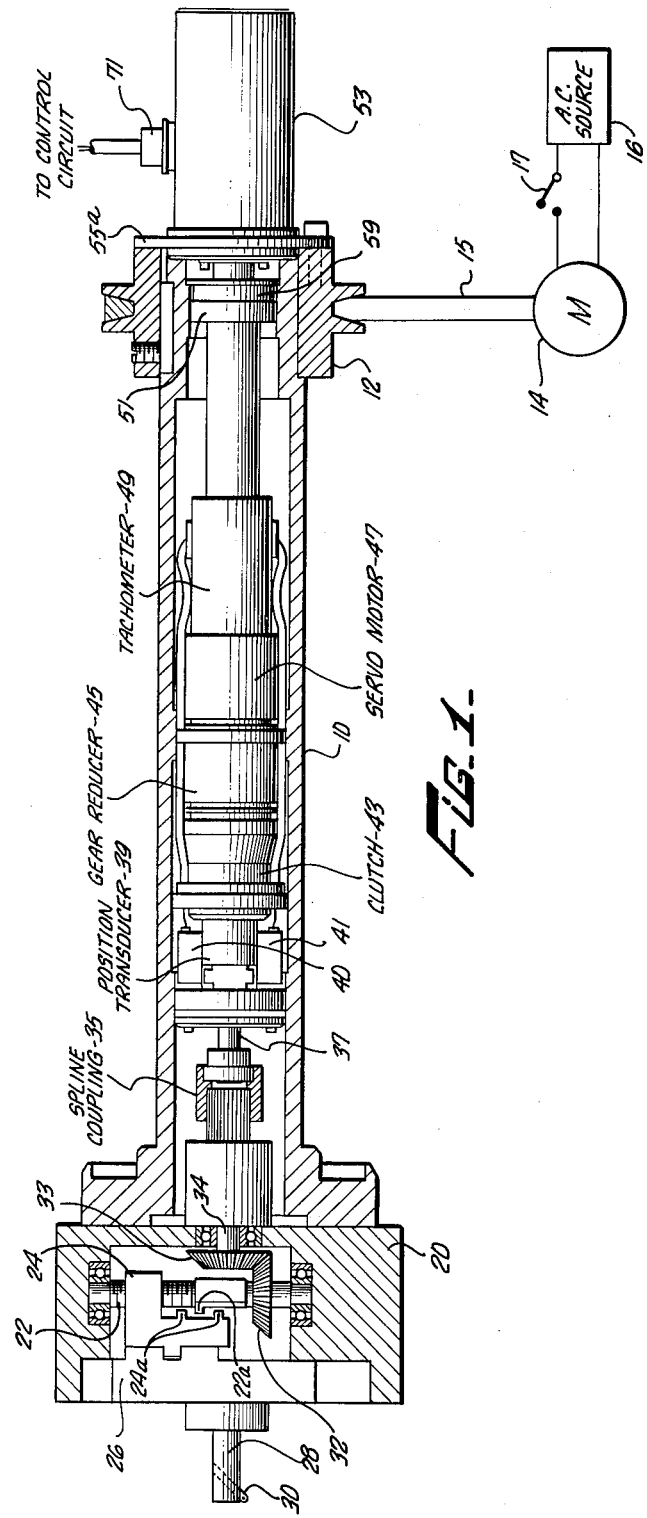

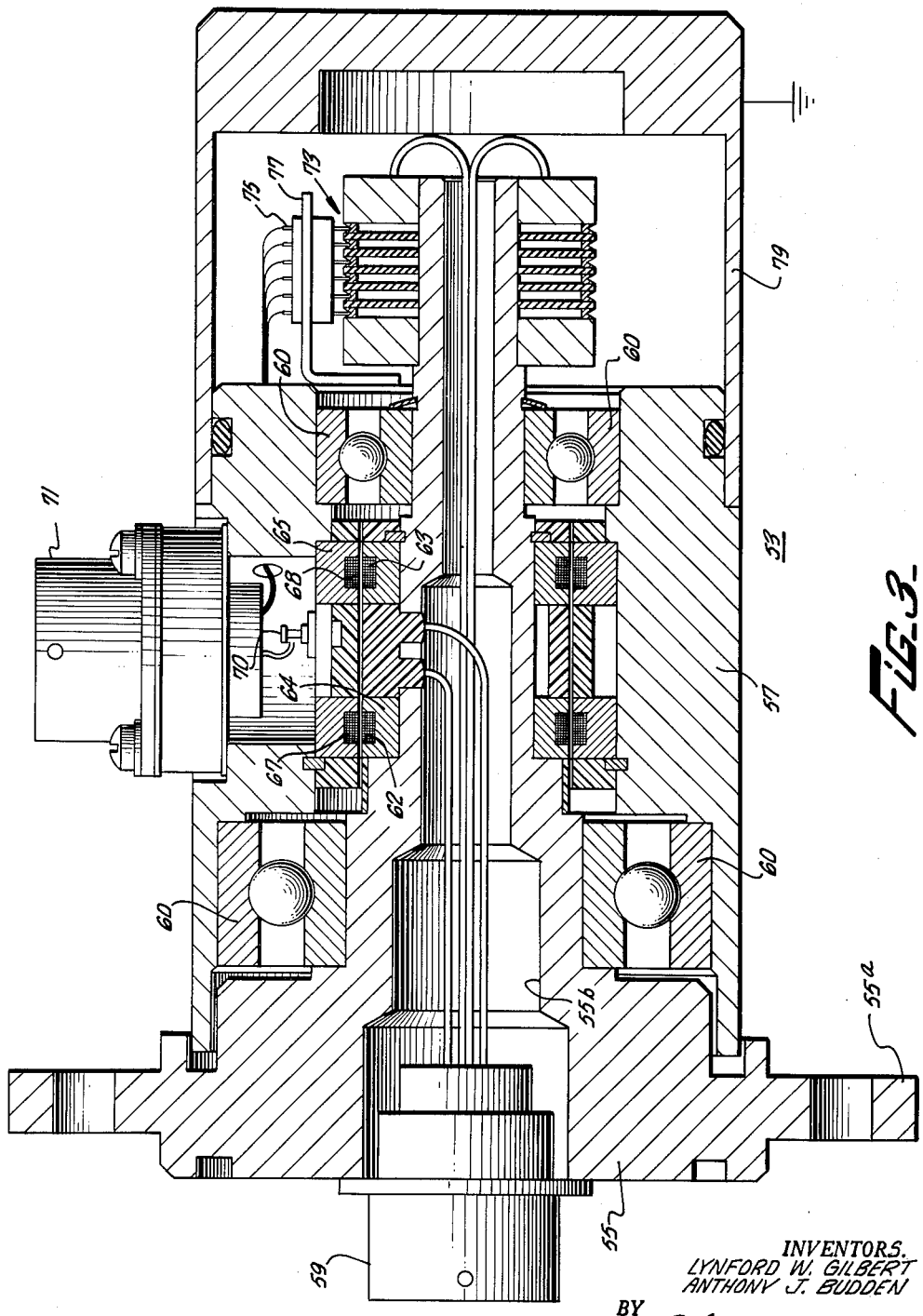

INVENTORS.
LYNFORD W. GILBERT
ANTHONY J. BUDDEN
BY
Christie, Parker & Hale
ATTORNEYS.

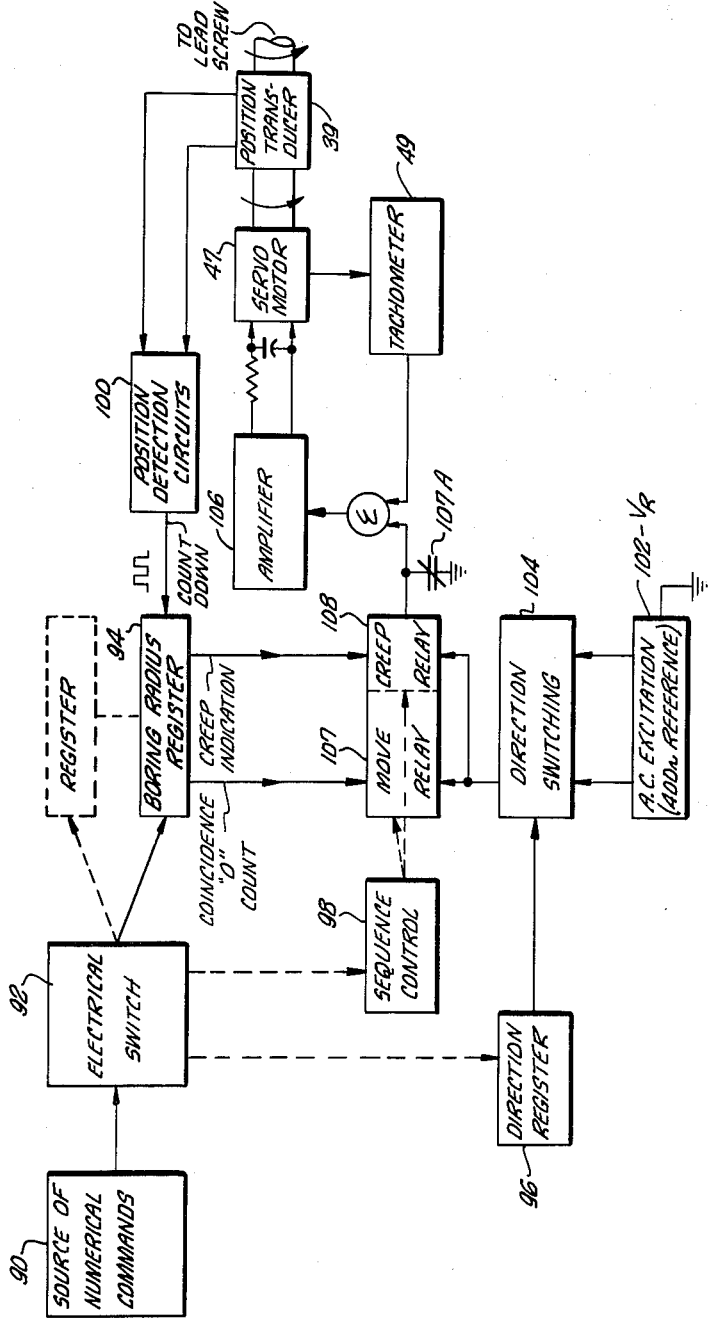

United States Patent Office 3,237,486
Patented Mar. 1, 1966

3,237,486
MACHINE TOOL
Lynford W. Gilbert, Palos Verdes Estates, Calif., and Anthony J. Budden, Little Chalfont, England, assignors, by mesne assignments, to Ex-Cell-O Corporation, Detroit, Mich., a corporation of Michigan
Continuation of abandoned application Ser. No. 69,203, Nov. 14, 1960. This application Oct. 3, 1963, Ser. No. 315,116
11 Claims. (Cl. 77—1)

This invention relates to machine tools and more particularly to numerically controlled machine tools. One specific embodiment of the invention is directed to improvements in the numerical control of a boring machine.

This application is a continuation of our earlier filed application bearing Serial No. 69,203, filed on November 14, 1960, now abandoned, entitled Machine Tool, and assigned to the same assignee as the present invention.

The use of digital techniques for controlling machine tools has been developed in recent years. The manual operations normally performed by a machine operator have been reduced to numerical commands or controls to move the machine members and tools in the same fashion as a human operator. However, the use of numerical commands allows a higher order of machining accuracies. The numerical commands or digital signals are generally stored on some media and then introduced into the numerical control circuitry proper for carrying out the commands. The conventional commands for controlling a machine tool include the commands for the positioning of the work piece relative to the cutting tool along three traditional axes—longitudinal, horizontal, and vertical. This may be accomplished by what is, now, conventional point-to-point control systems and many such systems are presently in commercial use. In some applications it has been found desirable to further control the cut of the tool in a milling, drilling, or boring operation. With respect to a boring machine, for example, this control of the cut requires a fourth axis of control, that is the control of the tool or radius axis.

With respect to operator controlled boring machines, in order to change the size of the cut or bore the operator must stop the boring spindle and remove the boring bar and replace it with a boring bar that will provide the correct boring radius. The use of a boring bar that is manually controlled further requires scribing of the work piece for each bore. There have been proposed arrangements for automatically controlling the boring diameter by means of numerical control circuits. These automatic control proposals for a boring machine have been produced by an arrangement which requires stopping the power or boring spindle and then numerically controlling an adjustment shaft to change the boring radius. These prior art numerically controlled machines necessitate the stopping of the power spindle since there is no control of the adjustment shaft while the spindle is in operation. That is, the power spindle or the control shaft must be alternately and selectively powered. Although these proposals have advantages over the manual control of a machine tool, in practice it is more advantageous, particularly wherein precision spindles are provided for a machine to allow the spindle to rotate continuously during the entire period the machine is being used. This allows the spindle to be substantially constant in operation in terms of heating, speed, and like. In order to allow the control of the boring radius while the boring spindle or power spindle is rotating, it is necessary to provide a control arrangement whereby continuous electrical coupling is provided between the numerical control circuitry and the control mechanism for effecting the control of the cut or boring radius.

This invention provides an improved arrangement for controlling the adjustment of a tool for a machine tool and thereby the cut by means of numerical commands. The control mechanism for the fourth axis is arranged whereby continuous electrical coupling is afforded between a tool adjusting or control shaft and the numerical control circuitry proper whereby the tool position may be commanded while the power spindle is rotating. This, therefore, implies that a control arrangement of this type when applied to a boring machine, for example, will allow the adjustment of the boring radius not only while the boring spindle is rotating but also allow the control mechanism to be adjusted for a different boring radius while the boring tool is still positioned in a bore.

In a specific embodiment of the invention, the numerical commands for the conventional positioning of the tool and work piece along the three traditional axes, longitudinal, cross, and vertical, are recorded on a storage medium along with the commands for the fourth axis, tool or radius axis, for a boring machine. The tool control mechanism for adjusting the tool axis has been adapted to allow it to continuously accept these numerical commands representative of the boring radius. The control mechanism is readily slipped into and completely housed anism includes a control or adjusting shaft, arranged by a conventional boring spindle and which control mechanism coaxially with the boring spindle, having a driving connection with the tool or boring bar. The control shaft is driven by an electrical servo motor which positions the boring bar in response to numerical commands representative of the desired boring radius as it was recorded on the storage media. The incremental displacements of the tool in response to the numerical commands are detected by a position transducer mounted within the boring spindle to be rotatable therewith. In addition, the boring spindle houses conventional mechanical slip coupling means and speed reducing means for driving the tool or boring head. The control of the tool adjusting shaft is further governed by a tachometer feedback arrangement to provide sufficient torque at all speed ranges and which tachometer is housed in the boring spindle and directly driven by the servo motor.

The continuous electrical coupling of these rotating control components is effected by a rotary or dynamic coupling means for inter-connecting the servo motor and tachometer as well as the position transducing means to the numerical control circuitry. This important coupling arrangement leads to the continuous control of the servo motor even while the boring spindle is rotating and thereby allows the adjustment of the boring radius with the spindle rotating.

These and other features of the present invention may be more fully appreciated when considered in the light of the following specification and drawings, in which:

FIG. 1 is a longitudinal sectional view, with portions in elevation, of a power spindle housing the control mechanism of the invention for a typical machine tool;

FIG. 2 is a longitudinal sectional view, with parts in elevation, of the servo control mechanism of FIG. 1 detached from the power spindle;

FIG. 3 is a longitudinal sectional view, with parts in elevation, of the coupling means of FIG. 1 detached from the power spindle;

FIG. 5 is a block diagram of a typical numerical control circuit for the control mechanism of FIG. 1.

Figure 4:
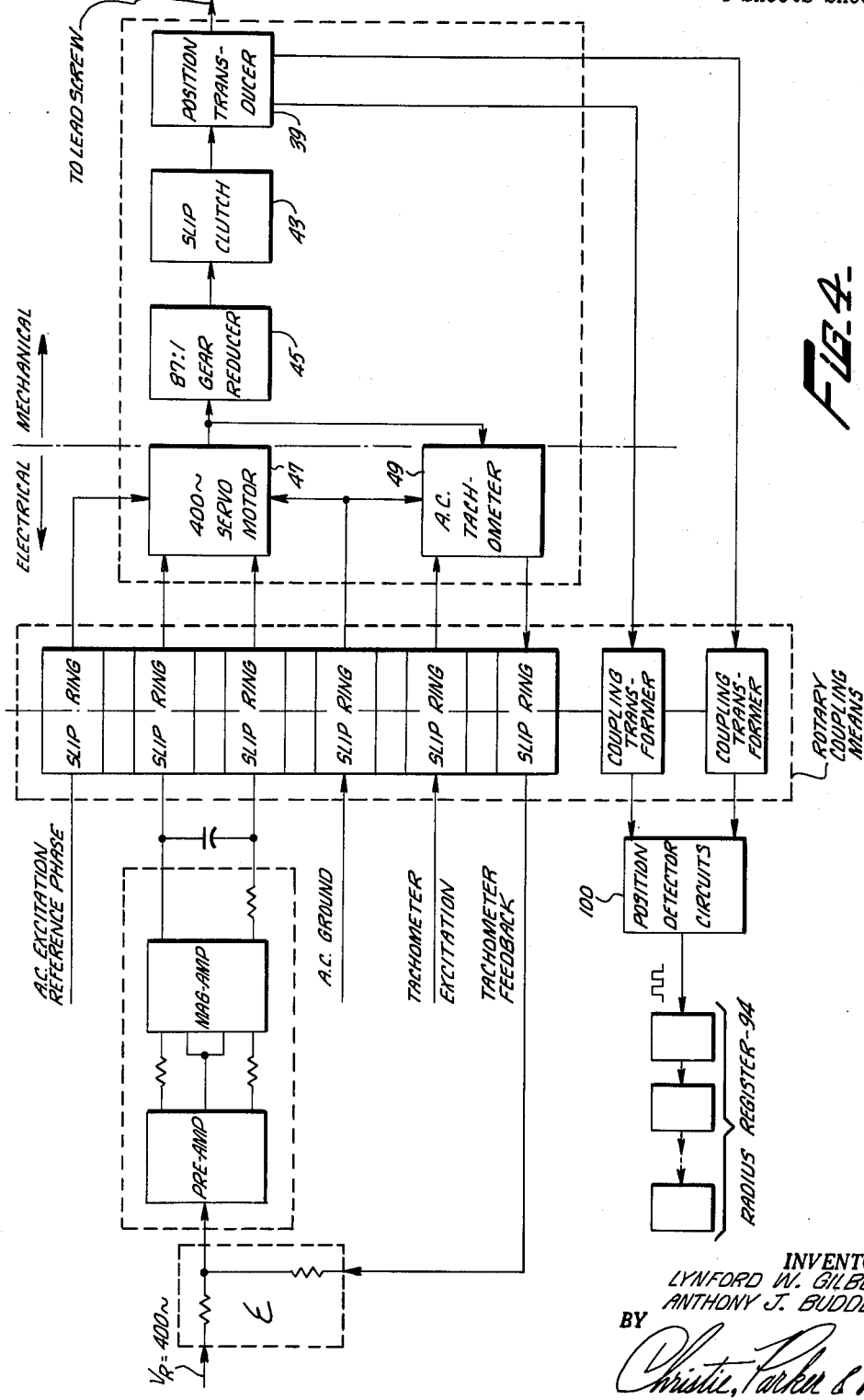
FIG. 4 is a diagrammatic representation of the control mechanism of the invention showing the relationship of the mechanical and electrical portions thereof.

It should be understood at the outset that the positioning control arrangement is applicable to any machine tool or mechanical arrangement wherein adjustment of one member relative to another is desired. For the purposes of this invention, however, the control arrangement can be best described as it is applied to a more or less conventional boring machine. To this end, only those portions of the boring machine which are necessary to an understanding of the invention are herein illustrated. Specifically, since the tool positioning control mechanism is to be operative while the boring spindle is rotating and the control mechanism is housed within the boring spindle, the structure for the boring spindle and its relationship with the control mechanism need only be considered. In addition, since the control arrangement is operative in combination with a numerical control circuit, it should be understood that the boring spindle is adapted to be located relative to the work piece in three degrees of translational freedom about orthogonally related axes, as is now conventional, whereby the boring tool is positioned adjacent the desired point on the work piece. These three degrees of translational freedom are generally referred to as the longitudinal, or X, cross, or Y, and vertical, or Z, axes. Of course, with the addition of the arrangement for controlling the boring radius, an additional axis must be controlled by means of the numerical control circuitry.

Now referring to the drawings, the invention will be described in more detail. The power spindle or boring spindle 10 is mounted on the boring machine proper whereby it may be continuously rotated. For this purpose the boring spindle 10 mounts a pulley 12 adjacent the right hand end thereof, as shown in FIG. 1, that is driven by a drive motor 14 by means of a belt 14 mounted therebetween. The motor 14 is connected to an alternating current source 16 that may be manually controlled by a switch 17. For the purposes of this discussion, it should be understood that when the boring machine is in operation the switch 17 is closed whereby the power spindle 10 is continuously rotating. In a practical application, this would mean that the power shaft 10 is rotating throughout an entire work day and, therefore, the control thereof need not be discussed.

The boring spindle 10 mounts a boring head 20 at the end opposite the pulley 12, shown adjacent the left hand end thereof. A precision lead screw 22 is housed in the boring head 20 and mounts a traveling nut 24 utilized to drive a slide 26. It will be understood that the rotation of the lead screw 22 drives the nut 24 and thereby the slide 26 to cause the radial displacement of the slide 26 relative to the axis of the power shaft 10. The slide 26, in turn, supports a boring bar 28 which is provided with a conventional boring tool 30. Therefore, in order to control the position of the boring tool 30 relative to the axis of the boring spindle 10 and thereby the boring radius, it is necessary to control the rotation of the lead screw 22. To this end, the lead screw 22 further mounts a spiral-beveled gear 32 cooperating with another similar spiral-beveled gear 33 arranged at substantially 90 degrees thereto and in driving relationship therewith. The bevel gear 33 is mounted on an input shaft 34 and is splined at the free end thereof. A spline coupling 35 is mounted on an end of a tool adjusting control shaft 37, to be coupled to the shaft 34. The control shaft is positioned by means of the numerical control circuitry, as will be described more fully hereinafter.

It should therefore now be clear that the positioning or rotation of the control shaft 37 is effective through the bevel gears 33 and 32 to rotate the precision lead screw 22 and thereby control the position of the boring bar 28 and the corresponding boring tool 30. The radial positioning of the boring bar 28 and thereby the changes in the boring radii that are possible through the controlled rotation of the shaft 37 is limited by the provision of a limiting means mounted in the boring head 20. The limiting means comprises two positive stop members 24a which are fixed with respect to the nut 24 and spaced such that a circumferential stop 22a on the lead screw 22 will interfere when the slide 26 is displaced at either end of its travel. This limiting means functions as a reference or zero position for the boring bar 28 and each boring position may be programmed by first running one of the walls of the opening 24a and thereby the nut 24 into the stop member 32 and then numerically commanding the tool to assume a position corresponding to the desired boring radius from this reference position. It will be recognized that this arrangement permits the programming of infinite boring diameters within this limited range.

The control shaft 37 is arranged coaxially with the boring spindle 10 and extends longitudinally therewith back from the spline coupling 35. The control shaft 37 mounts a position transducer 39 adjacent the splined end thereof. The position transducer 39 may take any of the well-known forms, but for the purposes of this invention, it can be considered a variable reluctance type of transducer. Various types of position transducers are described in an article appearing in "Control Engineering" for November 1955 on pages 77–81, including a disclosure of the variable reluctance type. The only limitation on the transducer is one of size, that is, it must fit into the power or boring spindle. Briefly, the transducer scale comprises a magnetic member or disc with lands and grooves on the cylindrical face thereof. The lands and grooves closely resemble the teeth on a standard precision gear whereby the reluctance of a magnetic head may be varied in accordance with the presentation of a gear tooth or land or the groove between successive teeth to provide an electrical indication for each change from a land to a groove. For the purposes of this invention, the magnetic gear or rotor would be mounted on the control shaft 37 to be rotatable therewith while magnetic heads 40 and 41 are mounted in a stationary position relative thereto. The pair of magnetic heads 40 and 41 are necessary to indicate the direction of displacement and, for this purpose, one head must be displaced 90 electrical degrees with respect to the other. The electrical indications from the magnetic heads 40 and 41 are applied to a detection circuit which converts the electrical indications into square waves for use in the numerical control circuit proper. The rotary scale may be defined with 125 teeth or lands to produce 500 pulses or counts per revolution. A transducer of these specifications, when employed with a lead screw having a pitch of twenty threads per inch, produces a resolution of .0001 inch.

Mounted adjacent to the transducer 39 on the control shaft 37 is a slip clutch 43. The slip clutch 43 is arranged to provide a driving connection with the rotor for the transducer 39 and is, in turn, driven through a gear reducer 45 mounted coaxially adjacent thereto. The gear reducer 45 is, in turn, driven by a conventional 400 cycle servo motor 47. The servo motor 47, therefore, is seen to drive the control shaft 37 and thereby the lead screw 22 through the gear reducer 45, the slip clutch 43, and the transducer 39. The purpose of the clutch 43 is merely to protect the gear reducer 45 and the servo motor 47 when the nut 24 is driven into engagement with the stop member 25 or to its radius limit and thereby also minimizes the stress or dynamic loading on the lead screw 22. The gear reducer 45 is necessary merely to produce sufficient torque for positioning the control shaft 37 and, for this purpose, may have a step down ratio of 87:1. Arranged on the opposite side of the servo motor 47 from the gear reducer 45 in driven relationship therewith is provided a tachometer 49. The tachometer 49 is utilized for the speed control of the servo motor 47 under creep conditions, as will be explained in more detail hereinafter. The lead wires for the transducers 40 and 41, the servo motor 47, and tachometer 49 are passed longitudinally of the boring spindle 10 and electrically connected to a conventional male connector 51, as best seen in FIG. 2.

It should be recognized that in order to control the shaft 37 while the boring spindle 10 is rotating, it is necessary to provide some form of dynamic coupling between the lead wires for the position transducer 39, servo motor 47, and tachometer 49 and thereby allow the control shaft 37 to be continually commanded by the numerical control circuitry. For this purpose a coupling assembly 53 is mounted to the free end of the boring spindle 10 adjacent the pulley 12. The coupling assembly 53 is shown in detail in FIG. 3 and comprises a rotor 55 and a stator 57. The rotor 55 includes a flanged portion 55a that is mounted to the spindle drive pulley 12 and therefore rotates with it. The stator 57, on the other hand, is restrained by a mounting strap (not shown) attached thereto. The coupling assembly 53 may be considered as comprising two separate portions, a transformer assembly portion and a slip ring assembly portion. The transformer assembly is utilized solely as the dynamic coupling means between the magnetic heads 40 and 41 and the numerical control circuitry proper, while the slip ring assembly provides the coupling arrangement between the control circuitry and the servo motor 47 and the tachometer 49; see FIG. 4.

First, considering the transformer assembly relative to the rotor structure 55, it will be noted that an electrical connector 59 which is coupled to the connector 51 interconnects the lead wires from the control mechanism proper. The connector 59 is mounted on the rotor 55 at the inner end of a longitudinal aperture 55b of the rotor and the lead wires laced therethrough. The rotor 55 is suitably journaled by means of bearings, such as the bearings 60, mounted outwardly of the flanged portion 55a.

The individual lead wires for the magnetic heads 40 and 41 are coupled through a longitudinal aperture 55b for the rotor 55 and are suitably connected to transformer windings 62 and 63 individual to the magnetic heads 40 and 41. The lead wires are secured in position by means of a potting compound provided intermediate the transformer windings 62 and 63 and their corresponding magnetic cores 64 and 65. The magnetic cores 64 and 65 are constructed from commercially available ferrite material which is rectangular in cross-section. These ferrite cores are then ground to form a U section to accept the primary and secondary windings in the stator and rotor respectively, that is, one-half of the U-section is mounted on the rotor 55 with its corresponding windings 62 and 63, while the other half of the U section is mounted on the stator 57 and is provided with its corresponding windings 67 and 68. The lead wires for the stator windings 67 and 68 are connected to a suitable terminal such as the terminal 70 and by appropriate lead wires are coupled to the connector 71 and thereby to the numerical control circuit proper.

In order to insure the correct alignment of the two U sections of the magnetic cores 64 and 65, the transformers and bearing surfaces of both the rotor and stator assemblies 55 and 57 are finish ground in a single set-up after assembly. To insure maximum coupling efficiency, the radial clearance between the primary and secondary is held to .001 inch, plus .0005 inch, minus 0 inch.

It should be noted that the rotary coupling means described immediately hereinabove is actually a combination transformer and slip ring assembly. However, it has been found that the mere use of slip rings for coupling to the position transducer produces too much noise to be of practical use.

The individual lead wires for the servo motor 47 and the tachometer 49 are passed from the electrical connector 59 through the aperture 55b and out the right hand end thereof as shown in FIG. 3 and are connected to a commercially available slip ring assembly 73. The slip ring assembly 73 comprises six slip rings for exciting the servo motor 47 and receiving the signals from the tachometer 49. The slip rings are shown as mounted on the rotor 55 in an insulative spaced relationship. Cooperating with each slip ring is a separate brush, such as the brush 75, in turn connected to individual lead wires and passed through the stator structure 57 to the connector 71 and thereby to the control circuitry proper. The brushes 75 are shown as mounted to the stator 57 by means of an L-shaped bracket 77. A cylindrical cover plate 79 encloses the slip ring assembly and seals the exposed end of the rotor 55 and stator 57.

In furtherance of the above structure, the electrical and mechanical phases of the control assembly are represented in diagrammatic form in FIG. 4. The illustration therein is simplified by means of blocks showing the relationship of the electrical and mechanical elements in the boring spindle 10 and their rotary coupling means to the control circuit proper by means of the slip rings and coupling transformers described. The mechanical portions of the control arrangements are indicated to the right of the dashed line labellel "mechanical." Included in the mechanical block is the gear reducer 45, slip clutch 43, and position transducer 39. To the left of the dotted line the electrical elements are shown and include the feedback arrangement for the tachometer 49. The signals from the slip rings and the coupling transformers are also connected to the control circuit proper and will be discussed more fully hereinafter.

Now, with reference to FIG. 5, the portions of the numerical control circuit essential to a complete understanding of the boring radius control will be examined. It should be recognized that a practical numerical control system is much more involved than the arrangement shown in FIG. 5 and includes the circuitry for controlling the conventional X, Y, and Z axes and all the auxiliary machine functions.

The source of numerical control signals or commands is represented by the block 90 and which source of signals controls the machine operations and resulting cutting operations in a sequential fashion. The source 90 generally is in the form of a perforated tape coded in either the binary or binary coded decimal system to control the operations of the machine in the desired fashion. The numerical commands are necessarily stored in registers in the control circuit proper until they are required for usage in the control operation. The numerical commands are distributed by means of an electrical switch 92 to these various registers, including the boring radius register 94. The registers receive the coded dimensional information from the source of commands 90 as well as the various auxiliary functions as they are sequentially distributed thereto by means of the electrical switch 92. The registers for accomplishing auxiliary functions include a direction register 96 and a sequence circuit 98. A practical embodiment for a machine tool input arrangement is shown and described in more detail in a copending application in the name of Lawrence E. Ivins entitled "Electronic Switch," bearing Serial No. 62,986 and filed on October 17, 1960 and assigned to the same assignee as this application.

At this point it should be recalled that the numerical control arrangement passes through two phases, a read phase and a machine phase. The read phase is essentially the distribution of the information from the source of numerical commands 90 to the various registers, circuits, and the like, and is adequately described in the aforementioned copending application. The machine phase to which the present control arrangement is directed functions after the registers have been loaded or have received the coded information from the source 90 and are in the process of carrying out the positioning of the various machine elements. As mentioned at the outset, it will be understood that the conventional positioning along the X, Y, and Z axes has been accomplished and it is only necessary to consider the control circuitry for the positioning of the boring tool in response to the boring dimension recorded in the boring register 94. It will be recognized that the boring radius register 94, or any other of the registers utilized in the control arrangement, may take any form, however, for the purposes of this invention the register may be simply considered to be a beam switching tube of the Dekatron type that has bi-directional characteristics as described in the aforementioned Ivins application.

For this invention, then, suffice it to say that the boring radius register 94 accepts the dimensional information from the source of commands 90 in a parallel fashion and each stage of the register is counted up to indicate the desired digit for the decimal order that the register represents. In order to actuate the control shaft 37 and position it in accordance with this desired boring radius, it merely requires the application of the pulses to the boring radius register 94 in a serial relationship to count down the boring radius register 94. As mentioned hereinabove, for each complete revolution of the lead screw 22 five hundred electrical indications are received and processed by a position detector circuit 100 to provide the train of signals to count down the boring radius register 94. The machine phase of the control operation is initiated in response to an end of block signal provided by the source of numerical commands 90 indicating all of the information from the source 90 for a single operation has been entered into the registers. This block signal further functions to directly switch from the read phase into the machine phase, and the machine is now in position to be automatically controlled. It will now be evident that the nut 24 will first be driven into engagement with the stop member 25 and then driven in the opposite direction a distance commanded by the boring radius register 94.

With the initiation of the machine phase, the squence control 98 and direction register 96 will have been actuated. The direction register 96 is merely responsive to a signal from the command source 90 to control the polarity of a 400 cycle reference signal source 102. This alternating current excitation is to be applied to the 400 cycle servo motor 47 to cause its shaft to rotate in a direction corresponding to the desired direction of travel for the nut 24. In a practical embodiment, the direction register 96 may be in the form of a relay winding, controlling a pair of contacts in series with the the alternating current excitation 102. The contacts are represented in block form as a direction switching block 104. The direction switching arrangement 104 is operative along with the sequence control 98 to apply the alternating current excitation from source 102 to an amplifier 106 controlling the excitation winding for the servo motor 47 by means of a pair of relay circuits identified as a move relay 107 and a creep relay 108. The relays 107 and 108 are further controlled by a separate one of the output circuits from the boring radius register 94. One of the outputs of the register 94 is identified as a creep indication and is, accordingly, coupled to the creep relay 108, while another output circuit is identified as the coincident output and is coupled to the move relay 107. The creep output circuit for the register 94 may correspond to a count of .0080-inch while the coincidence output circuit corresponds to a zero count. Stated differently, when the boring tool 30 approaches within .0080-inch of its desired position the creep relay 108 is de-energized and when the boring radius register 94 is completely counted down the move relay 107 is de-energized. The energization of both move relay 107 and creep relay 108 functions to place a predetermined reference voltage on the amplifier input which causes the servo motor 47 to move the boring tool in rapid traverse mode. Similarly, when the creep indication is reached, the creep relay 108 drops out placing a lower voltage on the amplifier input which causes the servo motor 47 to rotate at a correspondingly lower rate or creep speed. The de-energization of the move relay 107 causes a controlled corresponding contact 107a arranged in the input circuit of amplifier 106 to close and thereby ground the input which reduces the output speed to zero.

Consistent with the accuracy possible with a numerical control arrangement, it must also be necessary to accurately control the arrival of the boring tool 30 at the desired position without overshoot. Precise control has been afforded in the past by means of hydraulic motors and control arrangements, however, the use of an electric motor, as is employed in this application, requires some form of speed control since the required torque for driving the control shaft 37 is the same at creep speeds as it is in rapid traverse. To this end, the tachometer 49, which is directly driven by the servo motor 47, is arranged in a feedback circuit arrangement to provide this speed control. The feedback voltage from the tachometer 49 is coupled to the input circuit of the amplifier 106 in combination with the voltage provided by the reference source 102. The polarity of the alternating current excitation 102 relative to the excitation provided by the tachometer 49, which is rotating in the same direction as the servo motor 47, produces voltages of different polarity and, accordingly, a difference signal is applied to the amplifier 106. The two voltages are summed by individual resistors arranged in the input circuit of amplifier 106; see FIG. 4.

With the above structure in mind, the operation of the positioning arrangement will be described. It will be assumed that the operator has closed the switch 17 to rotate the boring spindle 10 and, after it has reached its desired speed and the numerical commands have been placed in their corresponding registers, the control for the boring tool 30 will be initiated. Initially, the control shaft 37 is actuated for a preselected time interval greater than the time required for the nut 24 to travel a distance greater than the total distance provided by the opening 24a. This insures that the nut 24 has been placed in its reference or zero position and the boring radius register 94 or incremental displacement of the control shaft 37 is commanded therefrom.

The sequence control 98 will thereafter arm the move relay and creep relay 107 and 108 respectively to cause the excitation of the servo motor 47 and thereby place it in the rapid traverse mode to drive the nut 24 in the correct direction for positioning the boring tool 30. With the rotation of the servo motor 47 the position transducer 39 is rendered operative and for each incremental displacement thereof a signal is applied to the boring radius register 94 to count it down a corresponding increment or decimal digit. In addition, the energization of the servo motor 47 drives the tachometer 49 causing it to provide the feedback signal for controlling the speed-torque characteristic of the servo motor 47. This operation continues in the rapid traverse mode until the boring radius register 94 is counted down to the desired creep count of .0080 inch, after which time the relay 108 is de-energized. The de-energization of the relay 108 causes its creep contacts 108a to open and reduces the excitation of the servo motor 47 to a relatively low voltage whereby the positioning of the boring tool 30 proceeds at a very low speed or creep rate. During this interval the position detector circuits 100, in response to the continued rotation of the position transducer 39, continues to provide count down signals to the register 94. After the count has passed the creep count, the register 94 is continually counted down until the register has been completely cleared or its records a zero count. This is designated as the coincident point since the tool 30 has reached its desired position. The zero output circuit from the boring radius register 94 is then effective to de-energize the move relay 107 and thereby causes its contacts 107a to immediately open. The opening of the contacts 107a completely de-energizes the servo motor 47 and the rotation of the control shaft 37 is immediately stopped leaving the boring tool 30 at the coincident point.

Assuming now, with the boring tool 30 still in the now completed bore for the work piece, it is desired that a bore of different radius be produced adjacent this bore, or a step boring operation. It is therefore necessary to command the control shaft 37, once again, from the source of commands 90. It will be assumed that the new boring radius is smaller than the initially programmed radius. Therefore, the control circuitry will be sequenced back into the read phase and the new boring radius is recorded in the boring radius register 94. This new command will merely be the difference between the two boring radii. At the completion of the read phase, the machine phase is once again initiated and the boring radius register 94 is counted down in response to the signals from the position transducer 39. Since the new dimension is merely recorded in the boring radius register 94 as the difference between the previous radius and the new radius, the tool is merely backed off from its present position a distance corresponding to this difference to reach the new position. Therefore, for this step boring operation, the nut 24 is not driven into the stop 25 and the tool positioned therefrom. The numerical commanding of the boring tool 30 for the new diameter will be in the same fashion as described for the larger radius. By programming from the largest radius to the smallest, position errors arising from drive system backlash are eliminated. The tool drawback lines are eliminated by adjusting the boring tool 30 before it is withdrawn from the bore.

In this same fashion, when the subsequent boring operation is required at a different position on the work piece, the boring spindle 10 will be located at this new position and the boring tool 30 programmed and numerically controlled for the desired boring radius at this new location.

It is therefore seen that the present invention advances the state of the machine tool art and the numerical control thereof through the provision of a control mechanism for positioning a tool while the power spindle for the tool is rotating and even while the tool is located within the work piece. The control mechanism has been adapted to be continuously under the command of the control circuits and the component parts thereof are easily arranged to be slipped into and out of a power spindle for inspection and repair.

What is claimed is:

1. A boring machine comprising a rotatable boring shaft including a boring head mounting a boring bar adapted to be adjusted for different boring radii, the boring head having a rotatable lead screw mounting a traveling nut for radially positioning the boring bar and means for limiting the total travel of the nut, means for rotating said boring shaft, a contral shaft coaxially mounted within said boring shaft to be rotatable therewith and having a driving connection with said lead screw for controlling the position of said boring bar upon actuation thereof, said control shaft mounting an incremental position transducer adjacent said lead screw for rotation therewith to sense the incremental changes in the position of the control shaft and providing an electrical output indication for each preselected incremental change in position, a control motor mounted in said boring shaft for driving said control shaft upon energization thereof, coupling means including speed reducing means mounted in said shaft and connected between said motor and said control shaft for driving the latter, tachometer means mounted on said control shaft to be directly driven by said control motor, a four axis digital control circuit means including electrical connections to said transducer, said control motor, and said tachometer for commanding the energization and de-energization of said control motor while the boring shaft is rotating and the boring bar and the workpiece have been positioned into cutting position, dynamic coupling means having rotary portions mounted for rotation with said boring shaft and electrically and individually connected to said transducer, control motor, and tachometer and having a stationary portion individually coupled to the rotary portions and separately connected with said control circuit, said control circuit means including a register for storing signals indicative of the desired boring radius from the limiting means, and a source of numerical commands connectable to said control circuit means for controlling the relative position of the boring head and the workpiece in accordance with the conventional three axes and for placing the numerical signal representative of the desired boring radius in the register, the control circuit including means for controlling the excitation of the control motor in accordance with the numerical signals in said register.

2. A boring machine comprising a rotatable boring shaft including a boring head mounting a boring bar adapted to be adjusted for different boring radii, means for rotating said boring shaft, a control shaft coaxially mounted within said boring shaft to be rotatable therewith and having a driving connection with said boring head for controlling the radial position of said boring bar upon actuation thereof, said control shaft mounting an incremental position transducer adjacent said boring head for rotation therewith to sense the incremental changes in the position of the control shaft and providing an electrical output indication for each preselected incremental change in position, a control motor mounted in said boring shaft for driving said control shaft upon energization thereof, coupling means including speed reducing means mounted in said boring shaft and connected between said motor and said control shaft for driving the latter, tachometer means mounted on said control shaft to be directly driven by said control motor, a four axis digital control circuit means including electrical connections to said transducer and said control motor for commanding the energization and de-energization of said control motor while the boring shaft is rotating and boring bar and the workpiece have been relatively positioned into cutting position, first dynamic coupling means having an electrical connection with said transducing means and mounted to be rotatable with said control shaft, a first plurality of separate coupling elements having individual electrical connections with said control motor and said tachometer, a stator carrying second coupling means arranged with said first coupling means for providing the transducer indications to said control circuit means and a corresponding second plurality of coupling elements arranged with a corresponding one of the first plurality of coupling elements having individual electrical connections to said control circuit means, said control circuit means including a register for storing signals indicative of a desired boring radius, a source of numerical commands connectable to said control circuit means for controlling the relative position of the boring head and a workpiece in accordance with the conventional three axes and for placing the numerical signal representative of the desired boring radius in the register and for causing the energization of the control motor, said register being arranged to receive the electrical indications from said transducer and to change the numerical signal after the reception of each signal representative of an incremental change in position, the control circuit including means for controlling the excitation of the control motor, and means responsive to a signal derived from the register to remove the excitation from the control motor.

3. A boring machine comprising a rotatable boring spindle including a boring head mounting a boring bar adapted to be adjusted for different boring radii, the boring head having a rotatable lead screw mounting a traveling nut for radially positioning the boring bar and means for limiting the total travel of the nut, means for rotating said boring spindle, a control shaft coaxially mounted within said boring spindle to be rotatable therewith and having a driving connection with said lead screw for controlling the position of said boring bar upon actuation thereof, said control shaft mounting an incremental position transducer adjacent said lead screw for rotation therewith to sense the incremental changes in the position of the control shaft and thereby the boring bar and providing an electrical output indication for each preselected incremental change in position, a control motor mounted in said boring spindle for driving said control shaft upon energization thereof, coupling means including speed reducing means mounted in said boring spindle and connected between said motor and said control shaft for driving the latter, coupling means mounted in driving relationship intermediate said transducer and said control motor, tachometer means mounted in said boring spindle on the opposite side of said control motor from said speed reducing means and in driven relationship therewith, control circuit means including means providing a continuous electrical coupling with said transducer, control motor, and tachometer for commanding the energization and de-energization of said control motor even during the rotation of the boring spindle, first transformer winding means having an electrical connection with said transducing means and mounted to be rotatable with said boring spindle, a plurality of slip rings mounted to be rotatable with said spindle and having separate electrical connections with said control motor and said tachometer, a stator carrying winding means coupled to said first winding means and electrically connected to said control circuit means and carrying a corresponding plurality of brushes for said slip rings electrically connected to said control circuit means, said control circuit means including a register for storing signals indicative of the desired travel of the nut from the limiting means, a source of numerical commands connectable to said control circuit means for placing the numerical signal representative of the desired boring radius in the register and for causing the energization of the control motor, said register being arranged to receive the electrical indications from said transducer and to change the numerical signal after the reception of each signal representative of an incremental change in position, the control circuit including amplifying means connected to amplify the difference between a source of power and the tachometer output signal for controlling the excitation of the control motor, means responsive to a predetermined numerical signal in said register to reduce the excitation of said motor to cause the control motor to drive at a reduced rate as the nut approaches the desired radius, and means responsive to the clearing of the numerical signals from the register to cause the removal of the excitation from the control motor whereby the nut has traveled the desired distance.

4. A digital positioning control arrangement for a machine tool adapted to be coaxially mounted with the rotatable power shaft of the machine adjacent the tool bearing end thereof, the power shaft having a radially adjustable tool head at one end thereof mounted for rotation therewith, said positioning control arrangement permitting the tool head to be continuously digitally positioned by a digital control circuit while the power shaft is rotating, said control arrangement comprising a tool adjusting shaft arranged to be coaxially disposed of said power shaft when mounted therein and to be mounted in a driving relationship with the tool head for radially displacing said tool head relative to the axis of the adjusting shaft, position transducing means mounted adjacent one end of said tool adjusting shaft for detecting and electrically indicating the movements of the tool head, drive means coaxially mounted adjacent the opposite end of said tool adjusting shaft from said transducing means and connected for rotating same, mechanical coupling means including speed reducing means mounted intermediate said transducing means and said drive means, tachometer means mounted on the opposite side of said drive means from said coupling means, and electrical rotary coupling means for providing a continuous electrical rotary coupling with digital control circuit and said drive means, said later-mentioned means being further characterized as being capable of coupling electrical signals from the transducing means and to the drive means while the power shaft is rotating.

5. A digital positioning control arrangement for a machine tool adapted to be coaxially mounted with the rotatable power shaft of the machine adjacent the tool bearing end thereof, the power shaft having a radially adjustable tool head at one end thereof mounted for rotation therewith, said positioning control arrangement permitting the tool head to be continuiusly digitally positioned by a digital control circuit while the power shaft is rotating, said control arrangement comprising a tool adjusting shaft arranged to be coaxially disposed of said power shaft when mounted therein and to be mounted in a driving relationship with the tool head for radially displacing said tool head relative to the axis of the adjusting shaft, position transducing means mounted adjacent one end of said tool adjusting shaft for detecting and electrically indicating the movements of the tool head, drive means coaxially mounted adjacent the opposite end of said tool adjusting shaft from said transducing means and connected for rotating same, mechanical coupling means including speed reducing means mounted intermediate said transducing means and said drive means, tachometer means mounted on the opposite side of said drive means from said coupling means, and electrical rotary coupling means for providing a continuous electrical rotary coupling with a digital control circuit and said drive means, said latter-mentioned means including a combination transformer and slip ring assembly for coupling electrical signals from the transducing means and to the drive means while the power shaft is rotating.

6. A digital positioning control arrangement for a boring machine to be inserted and coaxially mounted within the boring spindle, the boring spindle having a boring head mounting a boring bar adapted to be adjusted for different boring radii by means of a rotatable lead screw mounting a traveling nut having a preselected total travel, said positioning control arrangement comprising a control shaft adapted to be coaxially mounted within said boring spindle to be rotatable therewith and arranged to be mounted in a driving relationship with said lead screw for controlling the position of said boring bar, said control shaft mounting an incremental position transducer adjacent one end thereof for rotation therewith to sense the incremental changes in the position of the control shaft and providing an electrical output indication for each preselected incremental change in position, a control motor mounted at the opposite end of the control shaft from said transducer for driving same upon energization thereof, mechanical coupling means including speed reducing means mounted between said motor and said transducer, tachometer means mounted on the opposite side of said motor from said coupling means to be driven thereby, and rotary electrical coupling means adapted to be connected to a digital control circuit for commanding the energization and de-energization of said control motor and adapted to transmit the digital signals from said transducer thereto, said rotary coupling means including rotary transformer winding means having an electrical connection with said transducing means and adapted to be rotatable with said boring spindle, a plurality of slip rings mounted to be rotatable with said spindle and having separate electrical connections with said control motor and said tachometer, and a stator element carrying winding means coupled to said rotary winding means and carrying a corresponding plurality of brushes for said slip rings adapted to be electrically connected to the digital control circuit.

7. In a boring machine comprising a rotatable boring shaft including a boring head mounting a boring bar adapted to be adjusted for different boring radii, the boring head having a rotatable lead screw mounting a traveling nut for radially positioning the boring bar and means for limiting the total travel of the nut, boring bar positioning control apparatus coupled to the lead screw and coaxially mounted within the rotatable boring shaft for permitting the boring bar to be continuously positioned while the boring shaft is rotating including while the boring bar is positioned in a bore of a workpiece for performing step boring operations, said control arrangement including position transducing means and dynamic coupling means for continuously providing electrical coupling with a digital positioning control circuit to render the positioning control arrangement continuously controllable, and a four axis digital positioning control circuit connected to the positioning control apparatus by means of said coupling means for controlling the relative position of the boring bar and a workpiece in accordance with the conventional three axes and controlling the relative position of the boring bar and the workpiece in accordance with the fourth or boring axis.

8. In a machine tool including a rotatable power shaft having a radially adjustable tool head at one end mounted for rotating therewith, a tool head positioning control apparatus coaxially mounted with the rotatable power shaft adjacent the tool bearing end thereof, said control apparatus comprising a tool adjusting shaft arranged to be coaxially disposed of said power shaft when mounted therein and to be mounted in a driving relationship with the tool head for radially displacing said tool head relative to the axis of the adjusting shaft, position transducing means mounted adjacent one end of said tool adjusting shaft for detecting and electrically indicating the movements of the tool head, drive means coaxially mounted adjacent the opposite end of said tool adjusting shaft from said transducing means and connected for rotating same, mechanical coupling means including speed reducing means mounted intermediate said transducing means and said drive means, tachometer means mounted on the opposite side of said drive means from said coupling means, and electrical coupling means for providing a continuous electrical coupling with a digital control circuit and said drive means, said latter-mentioned means being further characterized as being capable of coupling electrical signals from the transducing means and to the drive means while the power shaft is rotating, and a four axis digital control circuit connected to the electrical coupling means to receive the signals from the transducing means and to provide signals to the drive means while the power shaft is rotating including while the power shaft is rotating and the tool head and a workpiece have been controllably positioned into cutting position in accordance with the three conventional axes specified by the digital control circuit to allow the cutting position to be changed.

9. In a machine tool including a rotatable power shaft having a radially adjustable tool head at one end mounted for rotation therewith, tool head positioning control apparatus coaxially mounted within the rotatable power shaft adjacent the tool bearing end thereof for permitting the tool head to be continuously positioned while the power shaft is rotating including while the tool head and workpiece are in cutting position, said control arrangement including dynamic coupling means comprising a combination transformed and slip ring assembly for continuously providing electrical coupling with a digital positioning control circuit to render the positioning control arrangement operative, and four axes digital positioning control circuit connected to the positioning control apparatus by means of said coupling means for controlling the relative position of the tool head and a workpiece in accordance with the conventional three axes and controlling the relative position of the tool head and the workpiece in accordance with the fourth axis.

10. A boring machine comprising a rotatable boring shaft including a boring head mounting a boring bar adapted to be adjusted for different boring radii, the boring head having a boring slide for radially positioning the boring bar relative to said boring shaft and means including and adjusting shaft coaxially disposed of said power shaft for controlling the position of the boring slide and thereby the boring radius, automatic means for continuously commanding and controlling the boring of a workpiece along three axes comprising automatically and continuously commanding and controlling the position of the adjusting shaft while including controlling said shaft the boring bar is in operation to position it to bore at a new boring radius.

11. In a numerically controlled boring maching having a rotatable boring shaft mounting a radially adjustable boring bar having a boring tool, boring bar positioning control apparatus for permitting the boring bar to be continuously positioned while the boring shaft is rotating, a four axes digital positioning control circuit connected to the positioning control apparatus for continuously controlling the relative position of the boring bar and a workpiece in accordance with the conventional three axes and continuously controlling the relative position of the boring bar and the workpiece in accordance with the fourth or boring axis including when the boring shaft is rotating, said digital positioning control including a source of numerical commands including a numerical command for positioning along the fourth axis.

References Cited by the Examiner
UNITED STATES PATENTS

| | | | |
|---|---|---|---|
| 2,196,231 | 4/1940 | Ridgway | 77—3 |
| 2,383,050 | 8/1945 | Esson. | |
| 2,826,943 | 3/1958 | Townsend | 77—3 |
| 2,945,401 | 7/1960 | Howey et al. | 77—3 |
| 3,079,522 | 2/1963 | McGarrell | 318—162 |
| 3,125,796 | 3/1964 | Brainard. | |

WILLIAM W. DYER, JR., *Primary Examiner.*

G. A. DOST, *Assistant Examiner.*